(12) United States Patent
Namiranian (10) Patent No.: US 10,477,383 B2
(45) Date of Patent: Nov. 12, 2019

(54) ESIM PROFILE METADATA PROVISIONING (71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/816,793

(22) Filed: Nov. 17, 2017

(65) Prior Publication Data
US 2019/0028883 A1    Jan. 24, 2019

Related U.S. Application Data (60) Provisional application No. 62/535,192, filed on Jul. 20, 2017.

(51) Int. Cl.
| | | |
|---|---|---|
| *H04W 8/18* | (2009.01) | |
| *H04W 8/20* | (2009.01) | |
| *H04W 8/26* | (2009.01) | |

(52) U.S. Cl.
CPC ............ *H04W 8/183* (2013.01); *H04W 8/205* (2013.01); *H04W 8/265* (2013.01)

(58) Field of Classification Search
CPC .............................. H04W 8/183; H04W 8/205
See application file for complete search history.

(56) References Cited

U.S. PATENT DOCUMENTS

| | | |
|---|---|---|
| 9,572,016 B2 | 2/2017 | Cormier et al. |
| 9,705,546 B2 | 7/2017 | Lee et al. |
| 9,712,996 B2 | 7/2017 | Park |

(Continued)

FOREIGN PATENT DOCUMENTS

| | | |
|---|---|---|
| EP | 2858393 A1 | 4/2015 |
| KR | 20130027096 A | 3/2013 |

(Continued)

OTHER PUBLICATIONS

The International Search Report and Written Opinion for PCT Application No. PCT/US2018/042181 dated Oct. 29, 2018, 11 pages.

(Continued)

*Primary Examiner* — Said M Elnoubi
(74) *Attorney, Agent, or Firm* — Han Santos, PLLC (57) ABSTRACT

A download order message is received from a business support function of a wireless communication carrier. The download order message is for initiating a preparation of an unpopulated eSIM profile for downloading to an EUICC on a user device. The unpopulated eSIM profile is an eSIM profile that lacks pre-populated profile metadata. A metadata provision value is extracted from the download order message. The metadata provision value is compared to a mapping table that maps profile metadata provision values to corresponding combinations of one or more metadata element values. Accordingly, a combination of one or more profile metadata element values for the unpopulated eSIM profile is identified based on the comparison of the metadata provision value to the mapping table. The combination of one or more profile metadata element values is then populated into the unpopulated eSIM profile to generate a populated eSIM profile.

20 Claims, 4 Drawing Sheets

(56) References Cited

U.S. PATENT DOCUMENTS

| | | | |
|---|---|---|---|
| 2010/0311404 A1* | 12/2010 | Shi | H04W 8/205 |
| | | | 455/419 |
| 2013/0301617 A1 | 11/2013 | Kuhn et al. | |
| 2014/0140507 A1 | 5/2014 | Park et al. | |
| 2014/0308991 A1 | 10/2014 | Lee et al. | |
| 2015/0110035 A1 | 4/2015 | Lee et al. | |
| 2015/0305004 A1 | 10/2015 | Ohta et al. | |
| 2016/0020802 A1 | 1/2016 | Lee et al. | |
| 2016/0094930 A1 | 3/2016 | Ramanna et al. | |
| 2016/0119780 A1 | 4/2016 | Jung et al. | |
| 2016/0283216 A1 | 9/2016 | Gao | |
| 2016/0302070 A1 | 10/2016 | Yang et al. | |
| 2016/0316356 A1 | 10/2016 | Li et al. | |
| 2017/0048713 A1 | 2/2017 | Guday et al. | |
| 2017/0070878 A1 | 3/2017 | Anslot et al. | |
| 2017/0150356 A1 | 5/2017 | Li et al. | |
| 2017/0171742 A1* | 6/2017 | Yang | H04W 8/245 |
| 2018/0014178 A1 | 1/2018 | Baek et al. | |
| 2018/0109942 A1 | 4/2018 | Lipovkov | |
| 2018/0123803 A1* | 5/2018 | Park | H04L 9/14 |
| 2018/0131699 A1* | 5/2018 | Park | H04W 12/06 |
| 2018/0160294 A1 | 6/2018 | Lee et al. | |
| 2018/0176768 A1 | 6/2018 | Baek et al. | |
| 2018/0295500 A1 | 10/2018 | Yang | |

FOREIGN PATENT DOCUMENTS

| | | |
|---|---|---|
| KR | 20140024796 A | 3/2014 |
| KR | 20170007807 A | 1/2017 |
| KR | 20170077489 A | 7/2017 |
| WO | 2014131785 A1 | 9/2014 |
| WO | 2016013827 A1 | 1/2016 |
| WO | 2016091414 A1 | 6/2016 |
| WO | 2016167551 A1 | 10/2016 |

OTHER PUBLICATIONS

The International Search Report and Written Opinion for PCT Application No. PCT/US2018/042182 dated Oct. 25, 2018, 9 pages.

The International Search Report and Written Opinion for PCT Application No. PCT/US2018/042183 dated Oct. 25, 2018, 10 pages.

The International Search Report and Written Opinion for PCT Application No. PCT/US2018/042185 dated Oct. 29, 2018, 10 pages.

The Non-Final Office Action for U.S. Appl. No. 15/816,826 dated Nov. 13, 2018, 45 pages.

U.S. Appl. No. 15/816,753, Notice of Allowance, dated Mar. 13, 2019, 35 pages.

U.S. Appl. No. 15/816,826, Notice of Allowance, dated Mar. 13, 2019, 26 pages.

U.S. Appl. No. 15/816,713, Notice of Allowance, dated Mar. 15, 2019, 37 pages.

* cited by examiner

ESIM PROFILE METADATA PROVISIONING

CROSS REFERENCE TO RELATED PATENT APPLICATION

This application claims priority to U.S. Provisional Patent Application No. 62/535,192, filed on Jul. 20, 2017, entitled "Subscription Managers," which is hereby incorporated by reference in its entirety.

BACKGROUND

The use of embedded Universal Integrated Circuit Cards (eUICCs), also referred to as embedded subscriber identity modules (eSIMs), are becoming increasingly prevalent in consumer and machine-to-machine (M2M) communication fields. Unlike a traditional UICC or SIM card that exists as a removable smart card that is transferrable between multiple device, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a wireless communication carrier. Other data that are stored in the eSIM profile may include carrier network information, security authentication information, a list of accessible network services, and/or so forth. A wireless communication carrier may transfer an eSIM profile to the eUICC via an over-the-air (OTA) update. In this way, a new subscriber with a user device that is equipped with an eUICC may sign up and receive telecommunication services from a wireless communication carrier without having to obtain a physical SIM card from the wireless communication carrier.

Each eSIM profile also contains multiple profile metadata elements, in which the metadata elements may include an integrated circuit card identifier (ICCID) of the profile, a profile name, a service provider name, a set of profile policy rules, etc. For example, the set of profile policy rules may dictate whether the eSIM profile can be enabled or disabled once the eSIM profile is installed onto an eUICC. Accordingly, some profile metadata elements of an eSIM profile, such as ICCID, service provider name, etc., are customized for individual wireless telecommunication carriers and/or eUICCs. Moreover, other profile metadata elements, such as eSIM profile policy rules, can be mixed and matched depending on the needs of a particular wireless telecommunication carrier and/or the specific telecommunication services that wireless telecommunication carrier desires to provide to different groups of subscribers.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques used by a wireless communication carrier to provision an eSIM profile with profile metadata elements. Each eSIM profile contains multiple profile metadata elements, in which the metadata elements may include an integrated circuit card identifier ICCID of the profile, a profile name, a service provider name, a set of profile policy rules, etc. For example, the set of profile policy rules may dictate whether the eSIM profile can be enabled or disabled once the eSIM profile is installed onto an eUICC. Accordingly, some of profile metadata elements of an eSIM profile, such as ICCID, service provider name, etc., are customized for individual wireless telecommunication carriers and/or eUICCs. Moreover, other profile metadata elements, such as eSIM profile policy rules, can be mixed and matched depending on the needs of a particular wireless telecommunication carrier and/or the specific telecommunication services that wireless telecommunication carrier desires to provide to different groups of sub scribers.

Wireless telecommunication carriers purchase eSIM profiles from eSIM profile vendors. In many instances, an eSIM profile vendor may be a manufacturer of eUICCs, and thus is able to generate eSIM profiles for installation in the eUICCs. However, wireless telecommunication carriers are unable to customize or modify the profile metadata of eSIM profiles once the eSIM profiles are purchased from the eSIM profile vendors. As a result, a wireless telecommunication carrier may need to purchase multiple different groups of eSIM profiles from an eSIM profile vendor, in which each group of eSIM profiles is pre-populated with a unique combination of metadata element values by the eSIM profile vendor.

Since eSIM profiles are purchased by a wireless telecommunication carrier in bulk well in advance of their eventual installation onto eUICCs of the subscriber user devices, the wireless telecommunication carrier is forced to forecast the number of eSIM profiles in each group to purchase. For example, a wireless telecommunication carrier may purchase 10,000 "group A" eSIM profiles, 20,000 "group B" eSIM profiles, and 30,000 "group C" eSIM profiles. However, any discrepancy between the forecasted number of eSIM profile of any group that are needed and the actual number of eSIM of the group that are distributed will result in unnecessary purchase of eSIM profiles belonging to one group, and a shortage of eSIM profiles that belong to another group. In the example above, if the actual demand for "group A" eSIM profiles is 20,000 and the actual demand "group B" eSIM profiles is only 10,000, then there is a large shortage of "group A" eSIM profiles and a stale inventory of "group B" eSIM profiles that may never get used.

In order for a wireless telecommunication carrier to provision an eSIM profile with a profile metadata, the carrier may initially obtain one or more unpopulated eSIM profiles from an eSIM vendor that are not pre-populated with eSIM profile metadata. Subsequently, during the preparation of an eSIM profile for download to an eUICC, a download order message that is sent by a business support function to a subscription management service may be modified to include a metadata provision value. The metadata provision value is translated by the subscription management service using a mapping table into a specification for a combination of one or more metadata element values. The subscription management service then populates an unpopulated eSIM profile with the combination of one or more metadata element values. Eventually, the populated eSIM profile is sent by the subscription management service to an eUICC of a subscriber user device for installation on the user device.

The implementation of eSIM profile metadata provisioning by a wireless communication carrier may reduce the waste and inefficiency associated with purchasing unnecessary quantities of eSIM profiles that are pre-populated with unsuitable profile metadata from eSIM profile vendors. In this way, such an implementation may allow the wireless communication carrier to reduce operating expenses by reducing or eliminating inventories of eSIM profiles with profile metadata that are unsuitable for use. Further, as eSIM profiles are configured to hold an ever-increasing number of metadata elements under future versions of the GSMA standard, the possible permutations of metadata element value combinations that can be stored in eSIM profiles will increase progressively. Thus, the ability for wireless communication carrier to tailor unpopulated eSIM profiles with specific combinations of profile metadata element values will become more and more useful. The techniques described herein may be implemented in a number of ways. Example implementations are provided below with reference to the following FIGS. 1-4.

Example Architecture

Figure 1:
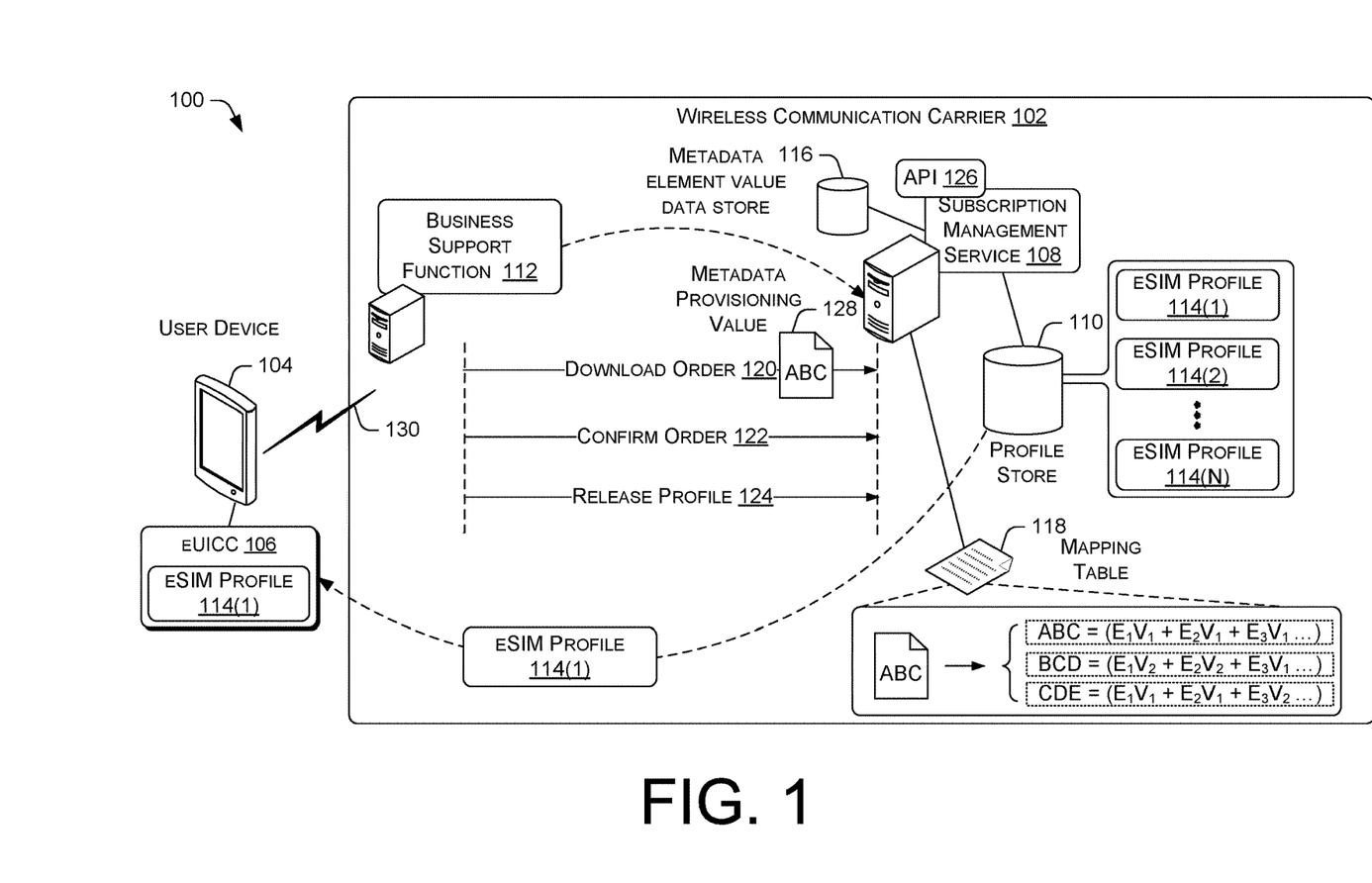
FIG. 1 illustrates an example architecture that enables a wireless communication carrier to implement eSIM profile metadata provisioning by the wireless communication carrier.

FIG. 1 illustrates an example architecture 100 that enables a wireless communication carrier to implement eSIM profile metadata provisioning by the wireless communication carrier. The wireless communication carrier 102 may provide a wide range of mobile communication services, as well as ancillary services and features, to subscribers and associated mobile device users. The wireless communication carrier 102 may also be referred to as a mobile network operator (MNO). In various embodiments, the wireless communication carrier 102 may provide wireless communication between multiple user devices. Further, the wireless communication carrier 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless communication carrier 102 may be implemented using multiple interconnected networks. In various embodiments, the wireless communication carrier 102 may include multiple Radio Access Networks (RANs). The RANs may be connected to each other via regional ground networks. In turn, the regional ground networks may be connected to a core network by a wide area network (WAN). Each regional portion of the wireless communication carrier 102 may include one or more RANs and a regional circuit and/or packet switched network and associated signaling network facilities. The wireless communication carrier 102 may provide telecommunication services in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), 5th Generation (5G), and/or so forth. In some embodiments, the core network of the wireless communication carrier 102 may be accessed via wired or wireless local area networks (LANs). For example, a wireless local area network may be a network that is established using Wi-Fi or Bluetooth standards and hardware.

A RAN of the wireless communication carrier 102 may include a number of base stations, also referred as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless communication carrier 102. The core network may connect to a public packet data communication network, such as the Internet. Data and voice communications via the RANs, the core network, and the Internet may support a variety of telecommunication services through the wireless communication carrier 102.

In various embodiments, 2G and/or 3G network components of the wireless communication carrier 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless communication carrier 102 may include an Evolved Packet Core (EPC) and an IP multimedia Subsystem (IMS) core.

The wireless communication carrier 102 may provide telecommunication services to multiple user devices, such as the user device 104. In various embodiments, the user devices may include a smartphone, a tablet computer, a smartwatch, an embedded computer system, or any other device that is capable of obtain telecommunication and/or data communication services from the wireless communication carrier 102. The user device 104 may be equipped with an eUICC 106, i.e., an integrated circuit chip that is directly wired or soldered to a circuit board of the user device. The eUICC 106 may store one or more eSIM profiles. Each eSIM profile may include information for accessing telecommunication services provided by a corresponding wireless communication carrier, such as the wireless communication carrier 102. Such information may include an eUICC ID (EID) of the eUICC, an international mobile subscriber identity (IMSI) number, security authentication information, an operator profile that enables the eUICC to authenticate with the wireless communication network, and/or so forth.

In various embodiments, each eSIM profile further contains associated profile metadata that is made up of multiple metadata elements. For example, the metadata elements may include an ICCID of the profile, a profile name, a service provider name (e.g., T-Mobile), a profile nickname of the end user, an icon, a profile class, notification configuration information, profile owner identifier, and a set of one or more profile policy rules. The profile owner identifier may include information such as a Mobile Country Code (MCC), a Mobile Network Code (MNC), and/or other identifier information. The profile policy rules may control the operation and/or usage of the eSIM profile. For example, the set of one or more profile policy rules may dictate whether the eSIM profile can be enabled or disabled once the eSIM profile is stored into an eUICC.

The user device 104 may be further equipped with a modem that enables the user device 104 to perform telecommunication and data communication with the wireless communication carrier 102. Accordingly, the modem may encode digital information for transmission in uplink radio signals to the wireless communication carrier 102, as well as decode digital information that are received from the wireless communication carrier 102 via downlink radio signals.

The user device 104 may receive eSIM profiles for storage on the eUICC 106 via over-the-air (OTA) updates from wireless communication carriers. For example, a subscription management service 108 of the wireless communication carrier 102 may send one or more data packets that contain an eSIM profile to the modem of the user device 104 via downlink communication. The data packets are assembled by the software of the modem into the eSIM profile and sent to the eUICC 106 for installation in the eUICC 106.

The core network of the wireless communication carrier 102 may provide subscription management service 108 for managing of eSIM profiles that are installed in the eUICCs of subscriber user devices. In various embodiments, the subscription management service 108 may be provided by one or more subscription managers, such as a Subscription Manager Data Preparation Plus (SM-DP+), and a Subscription Manager Secure Routing (SM-SR). The SM-DP+ is a service that configures an eSIM profile for OTA delivery to an eUICC, and the SM-SR is a service that securely delivers the eSIM profile to the eUICC, among other services. In various embodiments, the subscription management service 110 may be hosted at a data center of the wireless communication network 102 or hosted at a third-party data center for the benefit of the wireless communication network 102. For example, an eSIM manufacturer (EUM) may host the subscription management service 110 in its data center.

Additionally, the subscription management service 108 may be equipped with an eSIM profile store 110 that stores eSIM profiles managed by the wireless communication carrier 102, including duplicates of eSIM profiles that are already installed on eUICCs of subscriber user devices, and eSIM profiles that are available for installation on eUICCs. The core network may further include a business support function 112. The business support function 112 may enable the wireless communication carrier 102 to monitor the telecommunication services, such as data, voice, text, etc., that are used by each subscriber, and charge the subscribers based on service usage. In various embodiments, the business support function 112 may be provided by a Business Support System (BSS) or one or more equivalent core network components of the wireless communication carrier 102.

In operation, the wireless communication carrier 102 may initially obtain multiple unpopulated eSIM profiles 114(1)-114(N) for storage in the eSIM profile store 110, in which each of the unpopulated eSIM profiles is not pre-populated with any eSIM profile metadata. For example, the wireless communication carrier 102 may purchase the unpopulated eSIM profiles 114(1)-114(N) for one or more eSIM profile vendors. The business support function 112 may define profile metadata element values for provisioning into different groups of eSIM profiles. For example, the business support function 112 may define that the possible service provider names are "T-Mobile" and "Metro_PCS". In another example, the business support function 112 may generate the names "Profile_Policy_Rule_1", "Profile_Policy_Rule_2", and "Profile_Policy_Rule_3" as values for profile policy rules, in which each profile policy rule name corresponds to a particular defined profile policy rule that dictates the behavior of an eSIM profile on a user device. In other instances, the business support function 112 may use conventional metadata element values as defined values. For example, the business support function 112 may use one of the standard values "test", "operational," and "provisioning" for the profile class metadata element. In this way, the metadata element values that are defined by the business support function 112 may be organized into different combinations for different groups of eSIM profiles. In various embodiments, the business support function 112 may define the metadata element values based on definition inputs from an administrator of the wireless communication carrier 102 and/or business logics of the business support function 112. The defined metadata element values may be stored by the business support function 112 in the metadata element value data store 116.

Furthermore, the business support function 112 may generate a mapping table 118 for use by the subscription management service 108. The mapping table 118 may map a list of metadata provision values to corresponding combinations of metadata element values. For example, the metadata provision value "ABC" may map to a unique combination of metadata element values in which metadata element (ME) No. 1="T-Mobile", ME No. 2="Operational", and ME No. 3="Profile_Policy_Rule_1". The metadata provision value "BCD" may map to a unique combination of metadata element values in which ME No. 1="Metro_PCS", ME No. 2="Provisioning", and ME No. 3="Profile_Policy_Rule_1". Further, the metadata provision value "CDE" may map to a unique combination of metadata element values in which metadata element (ME) No. 1="T-Mobile", ME No. 2="Operational", and ME No. 3="Profile_Policy_Rule_2". These illustrative examples are represented symbolically in FIG. 1 with respect to the mapping table 118, in which each metadata element is denoted by $E_x$, and each metadata element value is denoted by $V_y$. In various embodiments, an administrator of the wireless communication carrier 102 may manually generate the mapping table 118. Alternatively, the mapping table 118 may be generated by a business logic of the wireless communication 102. The mapping table 118 is generated such that each unique combination of metadata element values is assigned a unique corresponding metadata provision value in the mapping table 118.

Subsequently, during the preparation of an eSIM profile for download to an eUICC, a download order message that is sent by the business support function 112 to a subscription management service 108 may be modified to include a metadata provision value. In various embodiments, the preparation of the eSIM profile for download to an eUICC may involve the business support function 112 sending a download order message 120, a confirm order message 122, and a release profile message 124 to the subscription management service 108. For example, the download order message 120 may send an ICCID of eSIM profile to the subscription management service 108 in order to reserve the eSIM profile for use with the eUICC. The download order message 120 may be initiated in response to a contract subscription process that is initiated for a user device, such as the user device 104. Following the confirmation of the eSIM profile reservation via the confirm order message 122, the release profile message 124 may be sent by the business support function 112 to the subscription management service 108 to activate the transfer of the eSIM profile to an eUICC of the user device. The business support function 112 may send the messages 120-124 to the subscription management service 108 by calling an application programming interface (API) 126 of the subscription management service 108. For example, a BSS of the wireless communication carrier 102 may send the messages 120-222 to the SM-DP+ via ES2+ commands as defined by GSMA technical specifications.

Thus, the download order message 120 that is sent to the subscription management service 108 may include a metadata provision value 128. The metadata provision value 128 may be selected by a logic of the business support function 112 based on the parameters of a contract subscription for a new subscriber of the wireless communication carrier 102. For example, the parameters may include whether the user device of subscriber is a subsidized device, whether the telecommunication services of the wireless communication carrier 102 is being provided directly by the wireless communication carrier 102 or by a virtual network operator (VNO) affiliated with the carrier, the geographical service regions included in the service contract for the telecommunication services, and/or so forth.

In turn, the subscription management service 108 may extract the metadata provision value 128 from the download order message 120. Subsequently, the subscription management service 108 may use the mapping table 118 to translate the metadata provision value 128 into a corresponding specification for a combination of one or more metadata element values. For example, if the metadata provision value 128 is "ABC", the value may be translated into a specification for a combination of metadata element values in which metadata element (ME) No. 1="T-Mobile", ME No. 2="Operational", and ME No. 3="Profile_Policy_Rule_1". Accordingly, the subscription management service 108 then populates an unpopulated eSIM profile from the eSIM profile store 110, such as the unpopulated eSIM profile 114(1), with the combination of one or more metadata element values that are retrieved from the metadata element value data store 116. However, while the examples shown above are discussed in the context of a single profile policy rule, a metadata provision value may be used to specify multiple profile policy rules. Further, in the case of profile policy rules, the metadata element value that is retrieved for population into the unpopulated eSIM profile 114(1) is the actual profile policy rule, rather than the name of the rule. The populated eSIM profile 114(1) is eventually sent by the subscription management service 108 via an OTA update to the eUICC 106 of the user device 104 through a communication link 130 that is established between the user device 104 and the wireless communication carrier 102.

Example Computing Device Components

Figure 2:
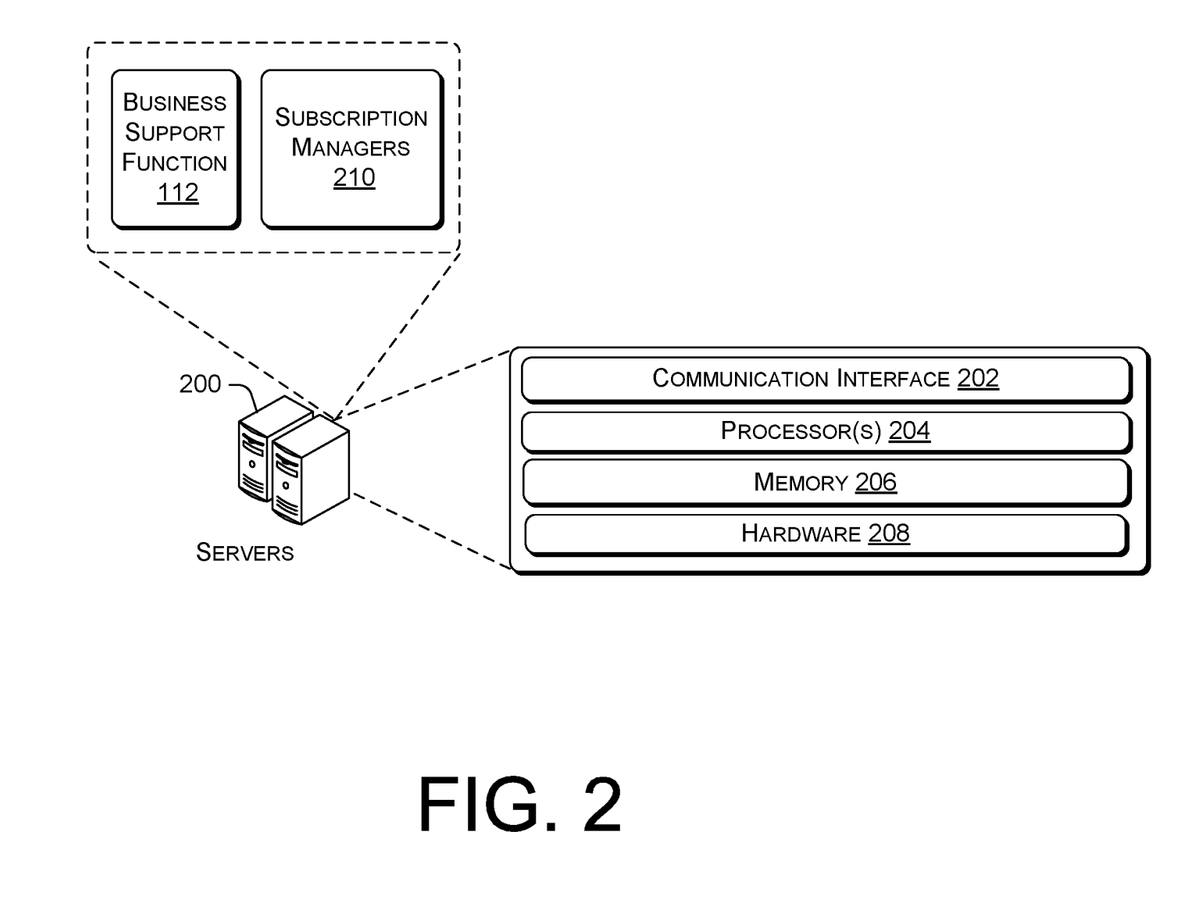
FIG. 2 is a block diagram showing various components of one or more illustrative computing devices that enable the implementation of eSIM profile metadata provisioning by a wireless communication carrier.

FIG. 2 is a block diagram showing various components of one or more illustrative computing devices that support the implementation of eSIM profile reuse by a wireless communication carrier. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In other embodiments, the computing devices 200 or components thereof may be virtual computing devices in the form of virtual machines or software containers that are hosted in a computing cloud.

The computing devices 200 may implement various back-end services and components of the wireless communication carrier 102, such as the business support function 112 and subscription managers 210 that provide the subscription management service 108. The implementation involves the execution of software, applications, and/or modules that include routines, program instructions, code segments, objects, and/or data structures that perform particular tasks or implement particular abstract data types.

Example Processes

Figure 3:
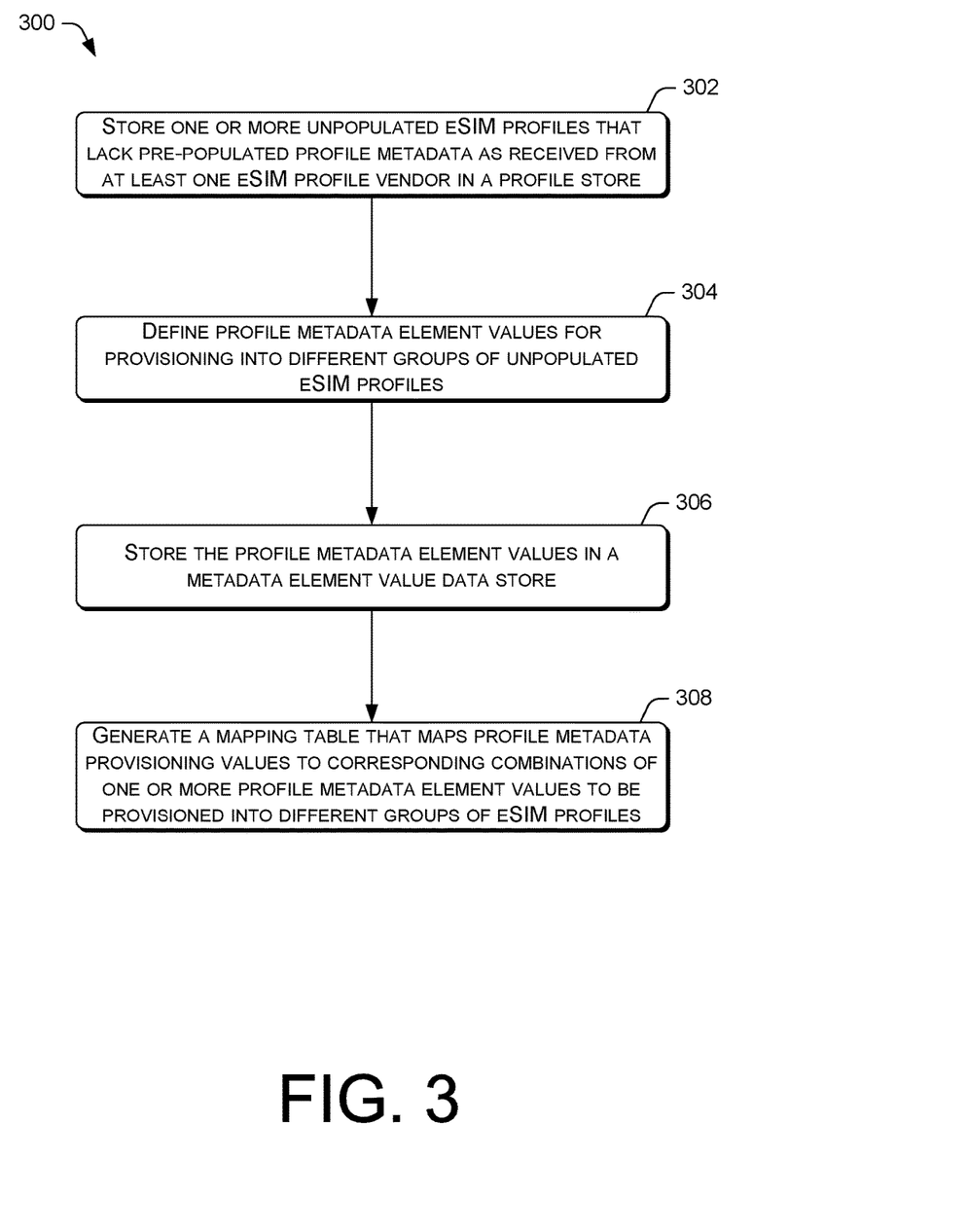
FIG. 3 is a flow diagram of an example process for supporting the implementation of eSIM profile metadata provisioning by a wireless communication carrier.
Figure 4:
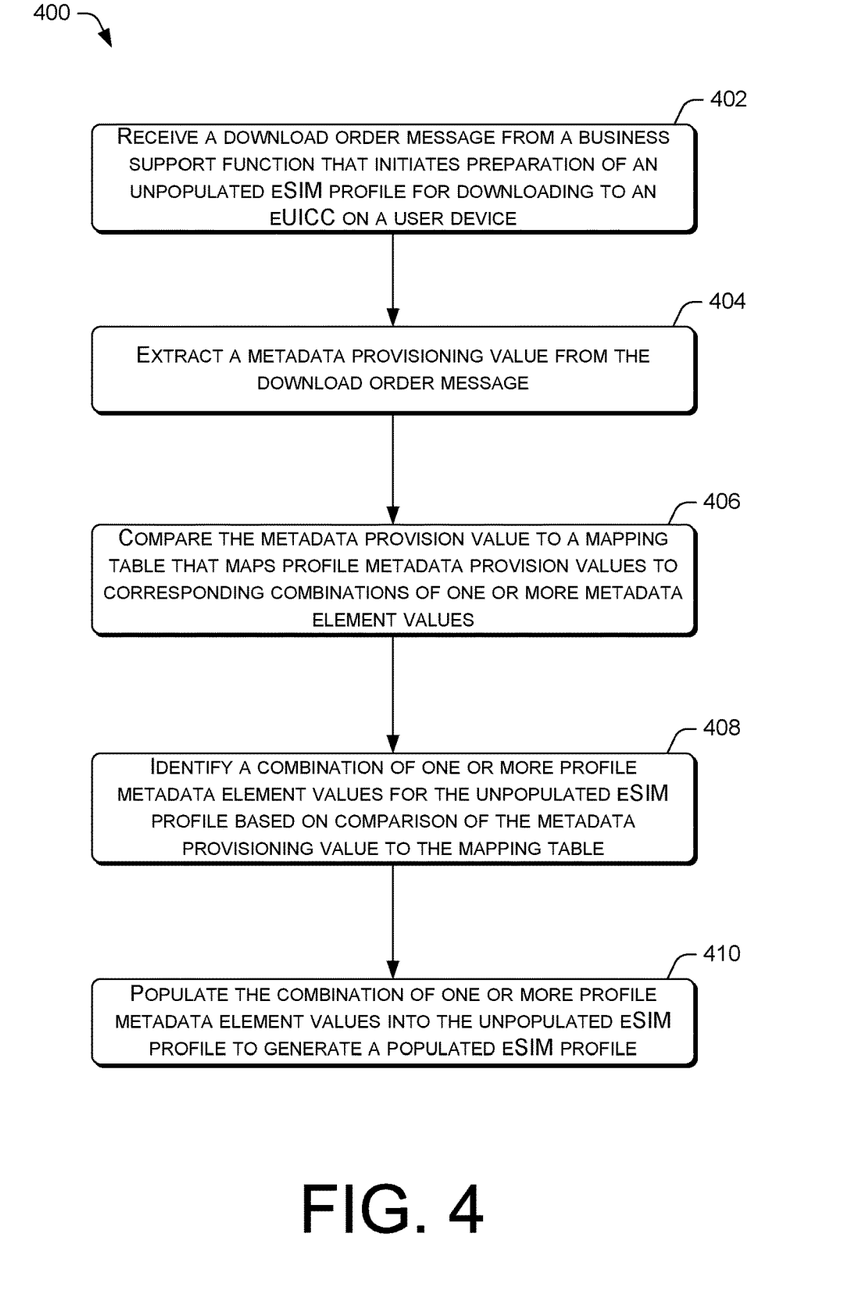
FIG. 4 is a flow diagram of an example process for provisioning an eSIM profile with profile metadata elements.

FIGS. 3 and 4 present illustrative processes 300 and 400 for a wireless communication carrier to provision an eSIM profile with profile metadata elements. Each of the processes 300 and 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the architecture 100 of FIG. 1.

FIG. 3 is a flow diagram of an example process 300 for supporting the implementation of eSIM profile metadata provisioning by a wireless communication carrier. At block 302, the subscription management service 108 of the wireless communication carrier 102 may store one or more unpopulated eSIM profiles that lack pre-populated profile metadata as received from at least one eSIM profile vendor in a profile store. For example, the wireless communication carrier 102 may purchase the unpopulated eSIM profiles 114(1)-114(N) for one or more eSIM profile vendors. The unpopulated eSIM profiles 114(1)-114(N) may be digitally transferred from the eSIM profile vendors to the wireless communication carrier 102. At block 304, the business support function 112 may define profile metadata element values for provisioning into different groups of unpopulated eSIM profiles. The different groups of unpopulated eSIM profiles may be configured for different groups of subscribers that have different telecommunication plans, different service tiers, different service payment plans, and/or so forth. In various embodiments, the business support function 112 may define the metadata element values based on definition inputs from an administrator of the wireless communication carrier 102 and/or business logics of the business support function 112. At block 306, the business support function 112 may store the profile metadata element values in the metadata element value data store 116.

At block 308, the business support function 112 may generate the mapping table 118 that maps profile metadata provision values (e.g., the metadata provision value 128) to corresponding combinations of one or more profile metadata element values to be provisioned into different groups of eSIM profiles. In various embodiments, an administrator of the wireless communication carrier 102 may manually generate the mapping table 118. Alternatively, the mapping table 118 may be generated by a business logic of the wireless communication carrier 102. The mapping table 118 is generated such that each unique combination of metadata element values is assigned a unique corresponding metadata provision value in the mapping table 118.

FIG. 4 is a flow diagram of an example process 400 for provisioning an eSIM profile with profile metadata elements. The example process 400 may be performed following the example process 300. At block 402, the subscription management service 108 may receive a download order message from the business support function 112 of the wireless communication carrier 102. The download order message may initiate a preparation of an unpopulated eSIM profile for downloading to an eUICC on a user device, such as the user device 104. The download order message may include a metadata provision value. In some embodiments, the download order message may be initiated in response to a contract subscription process that is executed for a subscriber that is associated the user device. At block 404, the subscription management service 108 may extract the provisioning value from the download order message.

At block 406, the subscription management service 108 may compare the metadata provision value to the mapping table 118 that maps profile metadata provision values to corresponding combinations of one or more metadata element values. At block 408, the subscription management service 108 may identify a combination of one or more profile metadata element values for the eSIM profile based on the comparison of the metadata provision value to the mapping table.

At block 410, the subscription management service 108 may populate the combination of one or more profile metadata element values into the unpopulated eSIM profile to generate a populated eSIM profile. In various embodiments, the subscription management service 108 may retrieve the one or more profile metadata element values from the metadata element value data store 116 and store the values into the unpopulated eSIM profile.

The implementation of eSIM profile metadata provisioning by a wireless communication carrier may reduce the waste and inefficiency associated with purchasing unnecessary quantities of eSIM profiles that are pre-populated with unsuitable profile metadata from eSIM profile vendors. In this way, such an implementation may allow the wireless communication carrier to reduce operating expenses by reducing or eliminating inventories of eSIM profiles with profile metadata that are unsuitable for use. Further, as eSIM profiles are configured to hold an ever-increasing number of metadata elements under future versions of the GSMA standard, the possible permutations of metadata element value combinations that can be stored in eSIM profiles will increase progressively. Thus, the ability of wireless communication carriers to tailor unpopulated eSIM profiles with specific combinations of profile metadata element values will become more and more useful.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

generating, by a business support function of a wireless communication carrier, a mapping table for use by a subscription management service of the wireless communication carrier, the mapping table maps a plurality of profile metadata provision values to corresponding multiple combinations of one or more metadata element values for provisioning into different groups of unpopulated eSIM profiles such that each unique combination of metadata element values is assigned a unique corresponding metadata provision value in the mapping table;

receiving, from the business support function of the wireless communication carrier, a download order message that includes a metadata provision value, the download order message for initiating a preparation of an unpopulated eSIM profile for downloading to an embedded Universal Integrated Circuit Card (eUICC) on a user device, the unpopulated eSIM profile lacking pre-populated profile metadata;

extracting the metadata provision value from the download order message;

comparing the metadata provision value extracted from the download order message to the mapping table that maps the plurality of profile metadata provision values to the corresponding multiple combinations of one or more metadata element values to identify a specific combination of one or more profile metadata element values that correspond to the metadata provision value for the unpopulated eSIM profile; and populating the specific combination of one or more profile metadata element values into the unpopulated eSIM profile to generate a populated eSiM profile.

2. The one or more non-transitory computer-readable media of claim 1, wherein the mapping table is generated by the business support function of the wireless communication carrier.

3. The one or more non-transitory computer-readable media of claim 1, wherein the download order message is initiated in response to a contract subscription process that is executed for a subscriber that is associated with the user device, the download order message reserving the unpopulated eSIM profile for use with the eUICC on the user device.

4. The one or more non-transitory computer-readable media of claim 1, wherein the preparation of the unpopulated eSIM profile for downloading to the eUICC on the user device further includes receiving a confirm order message that confirms the unpopulated eSIM profile is reserved for use with the eUICC on the user device, and receiving a release profile message that activates a transfer of the populated eSIM profile to a eUICC of the user device.

5. The one or more non-transitory computer-readable media of claim 4, wherein the receiving the download order message includes receiving the download order message as an ES2+command via an application programming interface (API).

6. The one or more non-transitory computer-readable media of claim 1, wherein the one or more metadata element values includes a metadata element value that is an Integrated Circuit Card identifier (ICCID) of the unpopulated eSIM profile, a profile name of the unpopulated eSIM profile, a service provider name, a profile nickname of an end user, an icon, a profile class, notification configuration information, a profile owner identifier, or a profile policy rule.

7. The one or more non-transitory computer-readable media of claim 6, wherein the profile policy rule dictates a behavior of the unpopulated eSIM profile on the user device.

8. The one or more non-transitory computer-readable media of claim 1, wherein the business support function is provided by a Business Support System (BSS) of the wireless communication carrier.

9. The one or more non-transitory computer-readable media of claim 1, wherein the metadata provision value is selected for the unpopulated eSIM profile based at least on whether the user device is a subsidized device, whether the unpopulated eSIM profile is for receiving telecommunication services directly from the wireless communication carrier or a virtual network operator (VNO) affiliated with the wireless communication carrier, or a geographical service region included in a service contract for the telecommunication services.

10. A computer-implemented method, comprising:
generating, by a business support function of a wireless communication carrier, a mapping table for use by a subscription management service of the wireless communication carrier, the mapping table maps a plurality of profile metadata provision values to corresponding multiple combinations of one or more metadata element values for provisioning into different groups of unpopulated eSIM profiles such that each unique combination of metadata element values is assigned a unique corresponding metadata provision value in the mapping table;
receiving, at the subscription management service of the wireless communication carrier, a download order message from the business support function of the wireless communication carrier that includes a metadata provision value, the download order message for initiating a preparation of an unpopulated eSIM profile that is stored in a profile store of the subscription management service for downloading to an embedded Universal Integrated Circuit Card (eUICC) on a user device, the unpopulated eSIM profile as stored in a profile store of the subscription management service lacks pre-populated profile metadata;
extracting, via the subscription management service, the metadata provision value from the download order message;
comparing, via the subscription management service, the metadata provision value extracted from the download order message to the mapping table that maps the plurality of profile metadata provision values to the corresponding multiple combinations of one or more metadata element values to identify a specific combination of one or more profile metadata element values that correspond to the metadata provision value for the unpopulated eSIM profile;
populating, via the subscription management service, the specific combination of one or more profile metadata element values into the unpopulated eSIM profile to generate a populated eSIM profile; and
sending, via the subscription management service, the populated eSIM profile to the eUICC of the user device for storage in the eUICC of the user device.

11. The computer-implemented method of claim 10, further comprising, prior to receiving the download order message from the business support function of the wireless communication carrier:
storing one or more unpopulated eSIM profiles that lack pre-populated profile metadata as received from at least one eSIM profile vendor in the profile store of the subscription management service.

12. The computer-implemented method of claim 10, wherein the subscription management service is provided by one or more subscription managers that execute on one or more computing devices, the one or more subscription managers including at least one of a Subscription Manager Data Preparation Plus (SM-DP+) or a Subscription Manager Secure Routing (SM-SR).

13. The computer-implemented method of claim 10, wherein the business support function is provided by a Business Support System (BSS) that executes on one or more computing devices.

14. The computer-implemented method of claim 10, wherein the download order message is initiated in response to a contract subscription process that is executed for a subscriber that is associated with the user device, the download order message reserving the unpopulated eSIM profile for use with the eUICC on the user device.

15. The computer-implemented method of claim 10, wherein the preparation of the unpopulated eSIM profile for downloading to the eUICC on the user device further includes receiving a confirm order message that confirms the unpopulated eSIM profile is reserved for use with the eUICC on the user device, and receiving a release profile message that activates a transfer of the populated eSIM profile to a eUICC of the user device.

16. The computer-implemented method of claim 10, wherein the one or more metadata element values includes a metadata element value that is an Integrated Circuit Card identifier (ICCID) of the unpopulated eSIM profile, a profile name of the unpopulated eSIM profile, a service provider name, a profile nickname of an end user, an icon, a profile class, notification configuration information, a profile owner identifier, or a profile policy rule.

17. The computer-implemented method of claim 16, wherein the profile policy rule dictates whether the eSIM profile can be enabled or disabled following storage of the eSIM profile into an eUICC.

18. A system, comprising:

one or more processors; and memory including a plurality of computer-executable components that are executable by the one or more processors to perform a plurality of actions, the plurality of actions comprising:

generating, by a business support function of a wireless communication carrier, a mapping table for use by a subscription management service of the wireless communication carrier, the mapping table maps a plurality of profile metadata provision values to corresponding multiple combinations of one or more metadata element values for provisioning into different groups of unpopulated eSIM profiles such that each unique combination of metadata element values is assigned a unique corresponding metadata provision value in the mapping table;

receiving from the business support function of the wireless communication carrier, a download order message that includes a metadata provision value, the download order message for initiating a preparation of an unpopulated eSIM profile for downloading to an embedded Universal Integrated Circuit Card (eUICC) on a user device, the unpopulated eSIM profile lacking pre-populated profile metadata;

extracting the metadata provision value from the download order message;

comparing the metadata provision value extracted from the download order message to the mapping table that maps the plurality of profile metadata provision values to corresponding multiple combinations of one or more metadata element values to identify specific combination of one or more profile metadata element values that corresponds to the meta provision value for the unpopulated eSIM profile;

populating the specific combination of one or more profile metadata element values into the unpopulated eSIM profile to generate a populated eSIM profile; and sending the populated eSIM profile to the eUICC of the user device for storage in the eUICC of the user device.

19. The system of claim 18, wherein the preparation of the unpopulated eSIM profile for downloading to the eUICC on the user device further includes receiving a confirm order message that confirms the unpopulated eSIM profile is reserved for use with the eUICC on the user device, and receiving a release profile message that activates a transfer of the populated eSIM profile to a eUICC of the user device.

20. The system of claim 18, wherein the one or more metadata element values includes a metadata element value that is an Integrated Circuit Card identifier (ICCID) of the unpopulated eSIM profile, a profile name of the unpopulated eSIM profile, a service provider name, a profile nickname of an end user, an icon, a profile class, notification configuration information, a profile owner identifier, or a profile policy rule.

* * * * *